US008266427B2

(12) United States Patent
Thubert et al.

(10) Patent No.: US 8,266,427 B2
(45) Date of Patent: Sep. 11, 2012

(54) SECURE MOBILE IPV6 REGISTRATION

(75) Inventors: Pascal Thubert, La Colle sur Loup (FR); Eric Michel Levy-Abegnoli, Valbonne (FR); Alpesh S. Patel, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1051 days.

(21) Appl. No.: 11/808,362

(22) Filed: Jun. 8, 2007

(65) Prior Publication Data

US 2008/0304457 A1    Dec. 11, 2008

(51) Int. Cl.
*H04L 29/06* (2006.01)
(52) U.S. Cl. ........................................ 713/162; 370/392
(58) Field of Classification Search .................... None
See application file for complete search history.

(56) References Cited

U.S. PATENT DOCUMENTS

| | | | |
|---|---|---|---|
| 2002/0133607 A1 | 9/2002 | Nikander | |
| 2003/0084293 A1* | 5/2003 | Arkko et al. | 713/168 |
| 2004/0008845 A1 | 1/2004 | Le et al. | |
| 2004/0029584 A1* | 2/2004 | Le et al. | 455/432.1 |
| 2004/0193875 A1* | 9/2004 | Aura | 713/162 |
| 2006/0005014 A1 | 1/2006 | Aura et al. | |
| 2006/0248230 A1* | 11/2006 | Kempf et al. | 709/245 |
| 2006/0253704 A1* | 11/2006 | Kempf et al. | 713/158 |

OTHER PUBLICATIONS

"Digital Signature", [online], [retrieved on May 4, 2007]. Retrieved from the Internet: <URL: http://en.wikipedia.org/w/index.php?title=Digital_signature&printable=yes>, pp. 1-13.
"Public-key cryptography", [online], [retrieved on May 4, 2007]. Retrieved from the Internet: <URL: http://en.wikipedia.org/w/index.php?title=Public-key_cryptography&printable=yes>, pp. 1-11.
Narten et al., "Neighbor Discovery for IP Version 6 (IPv6)", Network Working Group, Request for Comments: 2461, Dec. 1998, pp. 1-93.
Thomson et al., "IPv6 Stateless Address Autoconfiguration", Network Working Group, Request for Comments: 2462, Dec. 1998, pp. 1-25.
Droms et al., "Dynamic Host Configuration Protocol for IPv6 (DHCPv6)", Network Working Group, Request for Comments: 3315, Jul. 2003, pp. 1-101.
Nikander et al., "IPv6 Neighbor Discovery (ND) Trust Models and Threats", Network Working Group, Request for Comments: 3756, May 2004, pp. 1-23.

(Continued)

*Primary Examiner* — Gilberto Barron, Jr.
*Assistant Examiner* — Shaun Gregory
(74) *Attorney, Agent, or Firm* — Leon R. Turkevich

(57) ABSTRACT

In one embodiment, a method comprises receiving by an agent a request from a network node for generation of a secure IPv6 address for use by the network node, the request including a selected subset of parameters selected by the network node and required for generation of the secure IPv6 address according to a prescribed secure address generation procedure, the selected subset including at least a public key owned by the network node; dynamically generating by the agent at least a second of the parameters required for generation of the secure IPv6 address; generating by the agent the secure IPv6 address based on the selected subset and the second of the parameters required for generation of the secure IPv6 address; and outputting, to the network node, an acknowledgment to the request and that includes the secure IPv6 address, and the parameters required for generation of the secure IPv6 address.

32 Claims, 4 Drawing Sheets

OTHER PUBLICATIONS

Johnson et al., "Mobility Support in IPv6", Network Working Group, Request for Comments: 3775, Jun. 2004, pages 1-165.

Devarapalli et al., "Network Mobility (NEMO) Basic Support Protocol", Network Working Group, Request for Comments: 3963, Jan. 2005, pp. 1-33.

Arkko et al., "SEcure Neighbor Discovery (SEND)", Network Working Group, Request for Comments: 3971, Mar. 2005, pp. 1-56.

Aura, "Cryptographically Generated Addresses (CGA)", Network Working Group, Request for Comments: 3972, Mar. 2005, pp. 1-22.

Aboba et al., "The Network Access Identifier", Network Working Group, Request for Comments: 4282, Dec. 2005, pp. 1-16.

Patel et al., "Mobile Node Identifier Option for Mobile IPv6 (MIPv6)", Network Working Group, Request for Comments: 4283, Nov. 2005, pp. 1-8.

Patel et al., "Authentication Protocol for Mobile IPv6", Network Working Group, Request for Comments: 4285, Jan. 2006, pp. 1-19.

Levy-Abegnoli et al., U.S. Appl. No. 11/808,059, filed Jun. 6, 2007.

Narten et al., "Privacy Extensions for Stateless Address Autoconfiguration in IPv6", Network Working Group, Request for Comments: 3041, Jan. 2001, pp. 1-17.

Glass et al., "Mobile IP Authentication, Authorization, and Accounting Requirements", Network Working Group, Request for Comments: 2977, Oct. 2000, pp. 1-27.

* cited by examiner

SECURE MOBILE IPV6 REGISTRATION

TECHNICAL FIELD

The present disclosure generally relates to deployment of Secure Neighbor Discovery (SEND) in an Internet Protocol version 6 (IPv6) network.

BACKGROUND

The Internet Engineering Task Force (IETF) Request for Comments (RFC) 3971 describes a Secure Neighbor Discovery (SEND) protocol that specifies secure mechanisms to enable IPv6 nodes using Neighbor Discovery Protocol (NDP) according to RFC 2461 to counter malicious threats, without the necessity of IPSec protocols. NDP allows IPv6 nodes to determine each other's presence, to determine each other's link-layer addresses, to find routers, and to maintain reachability information about the paths to active neighbors. The SEND protocol specifies two new NDP options that must be supported to ensure security: a cryptographically-generated address (CGA) option that enables a receiving node to validate a CGA address of a transmitting node and that is generated in accordance with RFC 3972, and an RSA Signature Option that enables the receiving node to authenticate that the transmitting node owns the corresponding public and private keys used to generate the CGA Address and the RSA signature.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
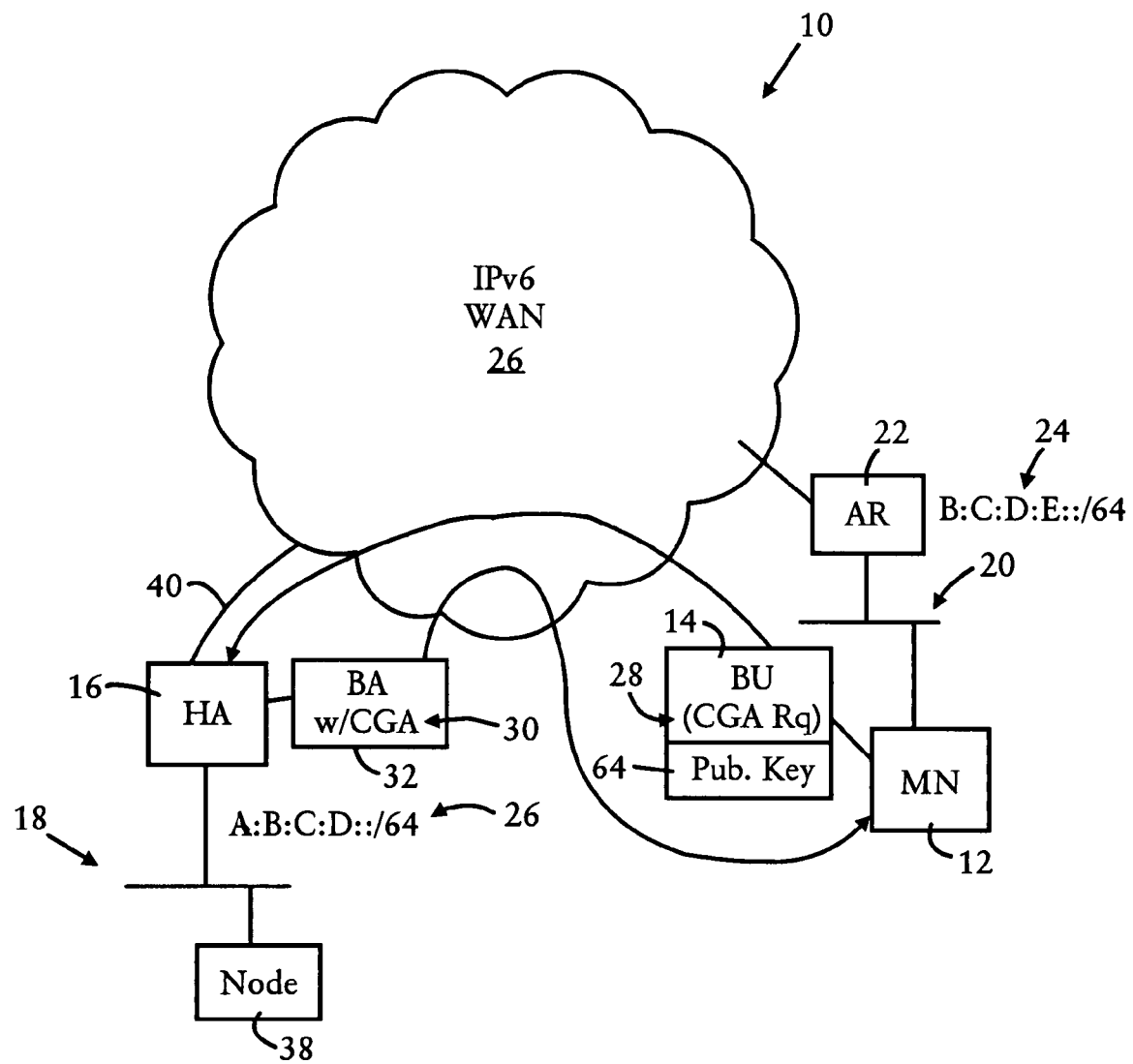
FIG. 1 illustrates an example system having a mobile IPv6 node sending a binding update request to a corresponding assigned mobile IPv6 home agent for generation of a secure IPv6 home address, according to an example embodiment.

In one embodiment, a method comprises receiving by an agent a request from a network node for generation of a secure IPv6 address for use by the network node, the request including a selected subset of parameters selected by the network node and required for generation of the secure IPv6 address according to a prescribed secure address generation procedure, the selected subset including at least a public key owned by the network node; dynamically generating by the agent at least a second of the parameters required for generation of the secure IPv6 address; generating by the agent the secure IPv6 address based on the selected subset and the second of the parameters required for generation of the secure IPv6 address; and outputting, by the agent to the network node, an acknowledgment to the request and that includes the secure IPv6 address, and the parameters required for generation of the secure IPv6 address.

In another embodiment, a method comprises outputting by a network node, to an agent, a request for a secure IPv6 address for use by the network node, the request including a public key owned by the network node; and receiving, by the network node and from the agent, an acknowledgment that includes the secure IPv6 address and parameters for generating the secure IPv6 address according to a prescribed secure address generation procedure.

In yet another embodiment, an apparatus comprises an IPv6 interface circuit configured for receiving a request from a network node for generation of a secure IPv6 address for use by the network node, the request including a selected subset of parameters selected by the network node and required for generation of the secure IPv6 address according to a prescribed secure address generation procedure, the selected subset including at least a public key owned by the network node; and an agent circuit configured for generating the secure IPv6 address based on dynamically generating at least a second of the parameters required for generation of the secure IPv6 address and based on applying the second of the parameters with the selected subset for generation of the secure IPv6 address; the agent circuit further configured for generating an acknowledgment to the request and that includes the secure IPv6 address, and the parameters required for generation of the secure IPv6 address, for output by the IPv6 interface circuit to the network node.

In another embodiment, an apparatus comprises a security circuit configured for generating a request to an agent for a secure IPv6 address for use by the apparatus as a network node, the request including a public key owned by the network node; and an IPv6 interface circuit configured for outputting the request to the agent, and receiving from the agent an acknowledgment that includes the secure IPv6 address and parameters for generating the secure IPv6 address according to a prescribed secure address generation procedure.

DETAILED DESCRIPTION

Particular embodiments described herein extend the capabilities of secure neighbor discovery, as described in RFC 3971, to enable cryptographically generated addresses (CGA) to be dynamically generated on behalf of mobile IPv6 nodes during registration of the mobile IPv6 nodes with their home agents, according to RFC 3775 and RFC 3963. Hence, a mobile IPv6 node can obtain a home address according to the CGA algorithm described in RFC 3972. Further, the home agent of the mobile IPv6 node, acting as a proxy on behalf of the mobile IPv6 node, can generate the secure IPv6 home address for the mobile IPv6 node according to the CGA algorithm, and validate the secure IPv6 home address on the home link of the home agent using secure neighbor discovery as described in RFC 3971.

Hence, the home agent can dynamically assign a secure IPv6 home address on behalf of the mobile IPv6 node, providing a secure, autoconfigured home address used by the mobile IPv6 node and that cannot be stolen by an untrusted or malicious entity; further, the generation of the secure IPv6 home address by the home agent reduces processing burdens on the mobile IPv6 node.

FIG. 1 illustrates an example system 10 having a mobile IPv6 node (MN) 12 configured for sending a binding update message 14 to a corresponding assigned mobile IPv6 home agent (HA) 16 for generation of a secure IPv6 home address 30, according to an example embodiment. As illustrated in FIG. 1, the mobile IPv6 node 12 is away from its home link 18 and attaches to a visited link 20 (i.e., a remote link or foreign link) that is provided by an access router 22 in the remote network. As recognized in the art, the mobile node 12 obtains a care of address based on an advertised network prefix (e.g., "B:C:D:E::/64") 24 advertised by the access router 22 and that is distinct from the network prefix (e.g., "A:B:C:D::/64") 26 on the home link 18.

Although the mobile node 12 can use the care of address for local communications on the visited link 20, the Mobile IPv6 protocol according to RFC 3775 and RFC 3963 requires the mobile node 12 to send a binding update message to its home agent 16, specifying that the home address (normally preconfigured in the mobile node 12) is reachable via the care of address obtained based on attachment with the access router 22 within the visited link 20, in order for the mobile node 12 to have global reachability via the wide area network 26. Consequently, a security risk arises if another network node (e.g., a malicious node) attempts to claim the same home address.

According to an example embodiment, the mobile node 12 is configured for generating a binding update message 14 that specifies the care of address used by the mobile node 12, a request 28 for generation of a cryptographically generated secure IPv6 home address 30 for use by the mobile node 12, and a public key 64 owned by the mobile node 12. The home agent 16, in response to receiving the binding update message 14, can dynamically generate the CGA 30 based on dynamically generating a required random number using the public key supplied by the mobile node 12, and sending the CGA 30 back to the mobile node 12 via the wide area network in a binding acknowledgment message 32.

Hence, the home agent 16 can dynamically generate a CGA 30 used by the mobile node 12 as a secure IPv6 address and generated based on the public key 64 owned by the mobile node 12. As described below, additional messages between the mobile node 12 and the home agent 16 can enable the secure IPv6 address, having been generated by the home agent 16, to be claimed on the home link 18 to prevent duplicate address generation and enable SeND compatible proxying.

Figure 2:
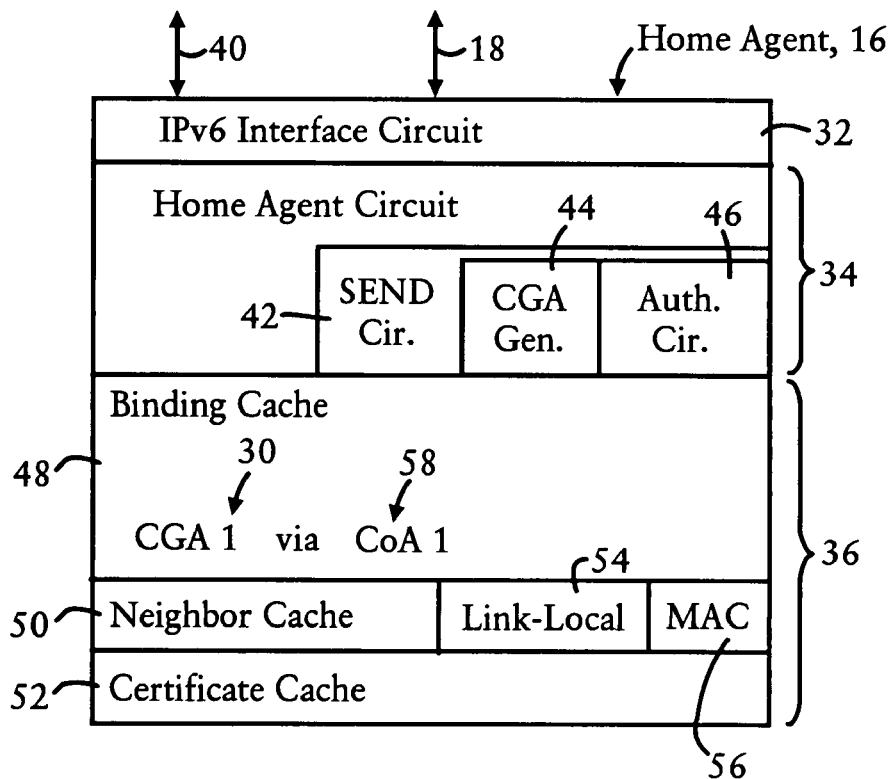
FIG. 2 illustrates an example home agent from the system of FIG. 1, according to an example embodiment.

FIG. 2 illustrates an example home agent 16, according to an example embodiment. The home agent 16 includes an IPv6 interface circuit 32, a mobile IPv6 home agent circuit 34, and a memory circuit 36. The IPv6 interface circuit 32 is configured for sending and receiving advertisement messages (e.g., neighbor solicitation messages, neighbor advertisement messages, router advertisement messages) according to the secure neighbor discovery protocol (as specified in RFC 3971) on a local link 18, as well as any data traffic, for example in the case of a data packet destined for a local IPv6 node 38 that is attached to the local link 18. The IPv6 interface circuit 32 also is configured for receiving the binding update message 14 from the mobile node via an egress link 40 supplied by an access router within the wide area network 26. As described below, the IPv6 interface circuit also is configured for outputting the binding acknowledgment messages 32 onto the egress link 40 for delivery to the mobile node 12 via the globally-reachable care of address specified in the binding update message 14.

The home agent circuit 34 is configured for performing home agent operations according to RFC 3775 in RFC 3963. The home agent circuit 34 includes a secure neighbor discovery (SEND) circuit 42 that includes a CGA generator circuit 44 and an authentication circuit 46. The CGA generator circuit 44 is configured for generating the CGA address 30 on behalf of the mobile node 12 in response to receiving the CGA request 28, and based on the public key 64 supplied in the binding update message 14. The authentication circuit 46 is configured for validating any received CGA addresses, any CGA signatures, or any RSA signatures as described in RFC 3971 or RFC 3972, as well as perform authorization delegation discovery to acquire a certification path from a given node to a trust anchor, described in further detail in RFC 3971.

The memory circuit 36 includes a binding cache 48, a neighbor cache 50 as described in RFC 2461, and a certificate cache 52 configured for storing received digital certificates either from IPv6 nodes, or routers establishing a certification path to a trust anchor. The neighbor cache 50 is configured for storing, for each received router advertisement message or neighbor advertisement message, a corresponding link local address 54 and the corresponding link layer (MAC) address 56 based on the received advertisement message, described in further detail in RFC 2461. The binding cache 48 is configured for storing the reachability of mobile IPv6 nodes 12, for example that the home address 30 assigned to the mobile node 12 is reachable via its corresponding specified care of address 58.

Figure 3:
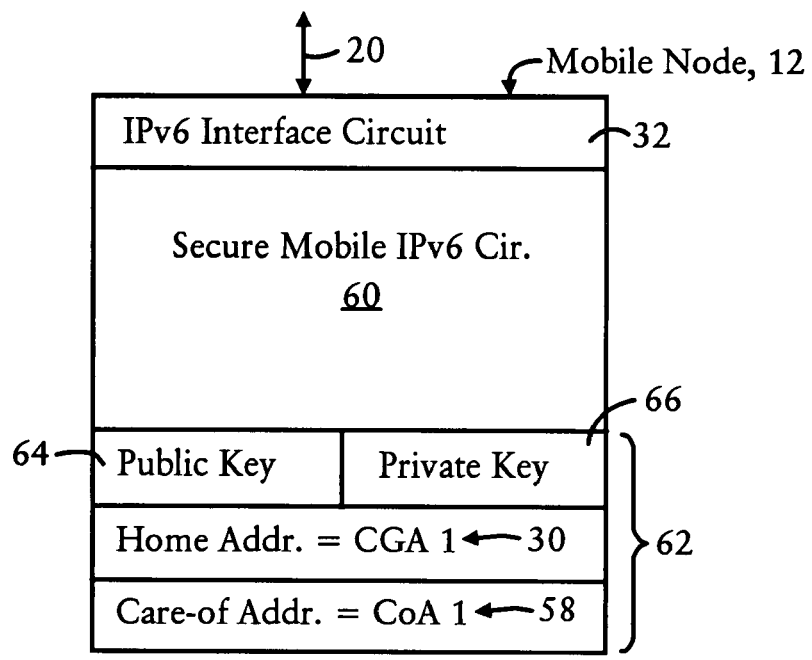
FIG. 3 illustrates an example mobile IPv6 node according to an example embodiment.

FIG. 3 illustrates an example mobile node 12, according to an example embodiment. The mobile node 12 includes the IPv6 interface circuit 32, a secure mobile IPv6 circuit 60, and a memory circuit 62. The secure mobile IPv6 circuit 60 is configured for sending a binding update message 14 in response to attachment by the corresponding IPv6 interface circuit 32 to a visited link 20, where the IPv6 interface circuit 32 of the mobile node 12 acquires a care of address, illustrated as the care of address "CoA1" 58. As illustrated in FIG. 3, the memory circuit 62 is configured for storing the public key 64 owned by the mobile node 12, the corresponding private key 66 associated with the public key 64, the home address "CGA1" 30 obtained from the home agent 16 (described below), and the care of address "CoA1" 58 obtained by the corresponding IPv6 interface circuit 32 upon the attachment to the visited link 20.

As described below, the secure mobile IPv6 circuit 60 can be configured for supplying its public key 64 with any binding update message 14 output to the home agent 16 via the wide area network 26. The secure mobile IPv6 circuit 60 also can be configured for generating a signature, for example an RSA signature as described RFC 3971, or a CGA signature as described in RFC 3972. The secure mobile IPv6 circuit 60 also can be configured for validating any received signature or CGA, in accordance with RFC 3971 and RFC 3972.

Any of the disclosed circuits of the home agent 16 or the mobile node 12 (including the IPv6 interface circuit 32, the home agent circuit 34, the memory circuits 36 or 62, or the secure mobile IPv6 circuit 60, as well as their associated components) can be implemented in multiple forms, including hardware logic that is implemented in a logic array such as a programmable logic array (PLA), a field programmable gate array (FPGA), or by mask programming of integrated circuits such as an application-specific integrated circuit (ASIC); any of these circuits also can be implemented using a software-based executable resource that is executed by a corresponding internal processor such as a microprocessor (not shown), where execution of executable code stored in internal memory (e.g., within the memory circuit 36 or 62) causes the processor to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 36 or 62 can be implemented as a non-volatile memory, for example an EPROM, a DRAM, etc.

Further, any reference to "outputting a message" or "outputting a packet" can be implemented based on creating the message/packet in the form of a data structure and storing that data structure in a tangible memory medium in the disclosed apparatus (e.g., in a transmit buffer), and electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

Figure 4:
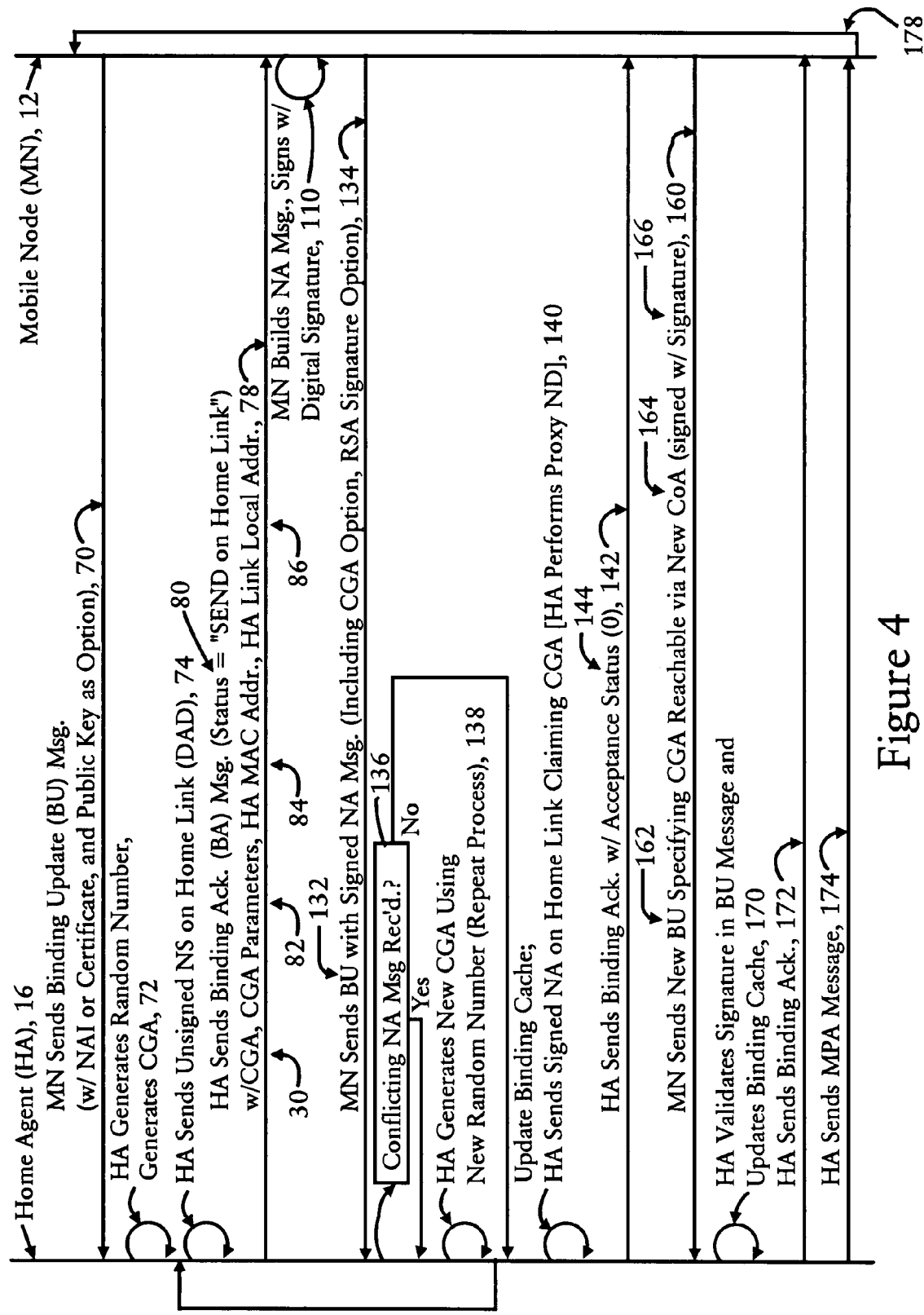
FIG. 4 illustrates an example method between the mobile IPv6 node and the home agent of generating a secure IPv6 home address for use by the mobile IPv6 node, according to an example embodiment.

FIG. 4 illustrates an example method between the mobile IPv6 node 12 and the home agent 16 of generating a secure IPv6 home address 32 for use by the mobile IPv6 node 12, according to an example embodiment. The steps described in FIG. 4 can be implemented as executable code stored on a computer readable medium (e.g., floppy disk, hard disk, EEPROM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

The method begins in step 70, where the secure mobile IPv6 circuit 60 of the mobile node 12 generates a binding update message 14 that includes the request 28 for generation of a secure IPv6 home address, in which also includes the public key 64 owned by the mobile node 12. The binding update request 28 also can include an identifier for uniquely identifying the network node, for example a network access identifier (NAI) according to RFC 4282 and 4283 that can be secured by a mobility message authentication option according to RFC 4285, or a digital certificate (e.g., a PKI certificate) issued by a trusted certifying authority; the binding update message 14 also can be signed by the secure mobile IPv6 circuit using its private key 66, in which case the generated signature would be appended to the binding update message 14. The generated binding update message 14 is output by the IPv6 interface circuit 32 of the mobile node 12 onto the visited link 20 for delivery to the home agent 16 via the wide area network 26.

The home agent 16, in response to its IPv6 interface circuit 32 receiving the binding update message 14 via the egress link 40, can dynamically generate in step 72 (or obtain) the remaining parameters necessary for generation of the CGA address as described in Section 2 of RFC 3972, including for example the sixteen-byte randomly generated modifier that can be dynamically generated using the subnet prefix 26, a three-bit security parameter obtained by the home agent 16 from its own interface identifier, and the supplied public key 64. Hence, the CGA generation circuit 44 in the home agent 16 dynamically generates the 16-byte modifier, and generates in step 72 a candidate CGA address for potential use as the secure IPv6 home address. As described below, the candidate CGA address is considered a fully authorized CGA address upon determining that no other local IPv6 node 38 claims the generated CGA address according to duplicate address detection as described in RFC 2461 and RFC 2462.

Figure 5:
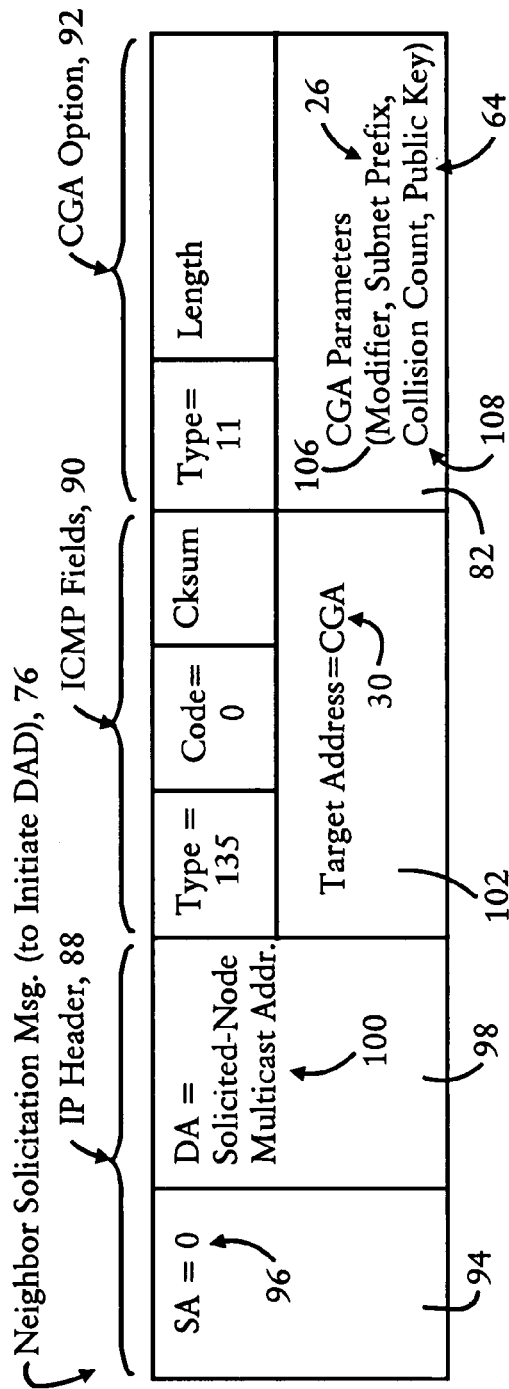
FIG. 5 illustrates an example neighbor solicitation message output by the home agent for duplicate address detection, according to an example embodiment.

In particular, the home agent circuit 34 generates in step 74 an unsigned neighbor solicitation message 76, illustrated in FIG. 5, to initiate duplicate address detection (DAD) on the home link 18. The unsigned neighbor solicitation message 76 is output by the IPv6 interface circuit 32 of the home agent 16 onto the home link 18 in order to "probe" if any other IPv6 node 38 claims the candidate CGA address.

FIG. 5 illustrates an example neighbor solicitation message 76 generated by the home agent circuit 34 and output onto the local link 18 on behalf of the mobile node 12, according to an example embodiment. The neighbor solicitation message 76 includes an IP header 88, ICMP fields 90, and a CGA option 92. The IP header 88 includes a source address field 94 that specifies an "unspecified address" value 96 of "0" in accordance with RFC 2461 indicating the lack of a address while verifying an address during address autoconfiguration. The destination address field 98 specifies a solicited node multicast address 100 of the target CGA address 30, as defined in Section 2.7.1 of RFC 2373. The ICMP fields 90 include a target address field 102 that specifies the CGA address 30 generated by the CGA generation circuit 44, and the CGA option 92 specifies the CGA parameters data structure 82 as specified in RFC 3972 (Section 3), including the randomly generated modifier 106, the subnet prefix 26, the collision count (initially set to zero) 108, and the public key 64 of the mobile node 12. As described in RFC 3971, the neighbor solicitation message 76 can be transmitted onto the local link 18 even though it is not signed using the private key 66 of the mobile node 12; rather, the message 76 simply will be regarded as insecure.

Referring back to FIG. 4, after transmitting the neighbor solicitation message 76 in step 74, the home agent circuit 34 does not wait for a response to the neighbor solicitation message 76 before sending back to the mobile node 12 a binding acknowledgment message 32 in step 78. The binding acknowledgment message 32 specifies the (candidate) CGA address 30, a status identifier 80 requesting generation of a signed neighbor advertisement message, the CGA parameters data structure 82 as required under RFC 3971 and RFC 3972, the link layer MAC address 84 of the home agent, plus the link local address 86 of the home agent. In response to the IPv6 interface circuit 32 of the mobile node 12 receiving the binding acknowledgment message 32 in step 78, the secure mobile IPv6 circuit 60 of the mobile node 12 detects the request for generation of a signed neighbor advertisement message from the status field 80, and generates in step 110 a neighbor advertisement message 112, illustrated in FIG. 6, based on the contents of the binding acknowledgment message 32. The secure mobile IPv6 circuit 60 also signs the neighbor advertisement message 112 with a digital signature 114 signed with the MN private key 66, as required under RFC 3971.

Figure 6:
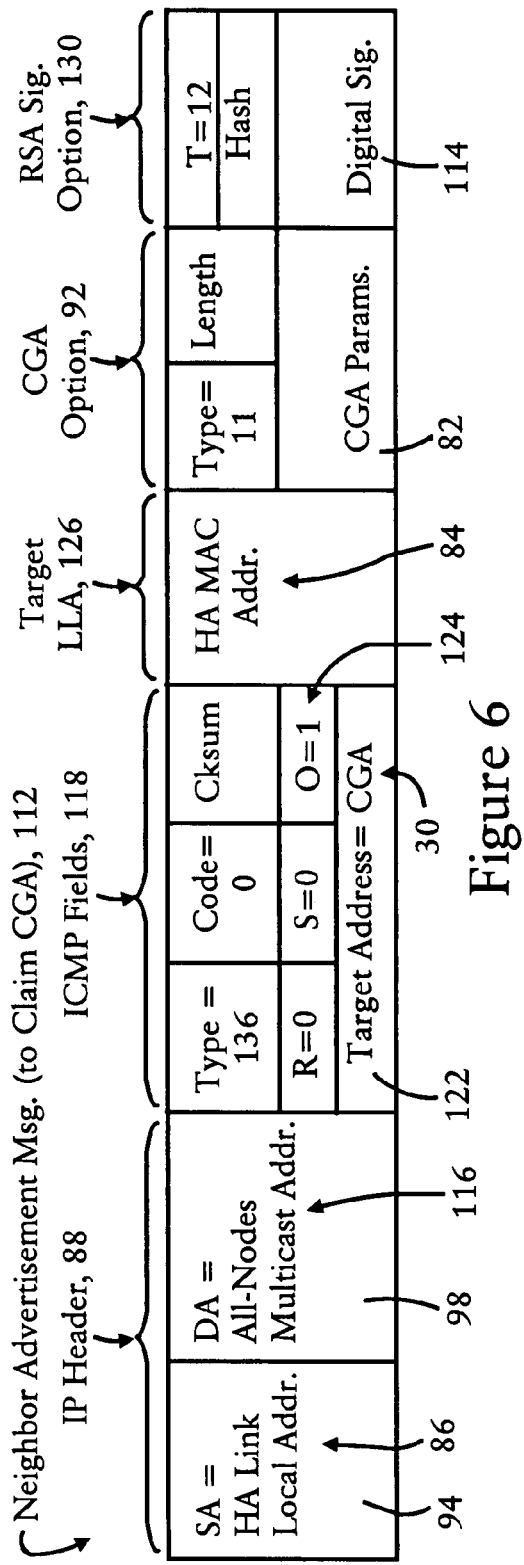
FIG. 6 illustrates an example neighbor advertisement message output by the home agent for claiming the secure IPv6 home address, according to an example embodiment.

As illustrated in FIG. 6, the IP header 88 of the neighbor advertisement message 112 generated by the secure mobile IPv6 circuit 60 includes a source address field 94 that specifies the link local address 86 of the home agent 16, and a destination address field 98 specifying the all nodes multicast address 116 for the nodes 38 on the home link 18. The ICMP fields 118 include the required fields as specified in RFC 2461, including a target address field 122 specifying the CGA address 30. Also note that the override field 124 is set to "1", to indicate that the home agent MAC address 84 specified in the target link layer address option 126 should be used as the link layer address for the CGA address 30 specified in the target address field 122; hence, the home agent 16 can act as a proxy for the mobile node 12 on the home link 18. The neighbor advertisement message 112 also includes the CGA option 92 including the identical parameters as illustrated in FIG. 5. A secure mobile IPv6 circuit 60 signs the neighbor advertisement message 112 by adding the RSA signature option 130, based on performing a cryptographic hash of the preceding portions 88, 118, 126, and 92 with the private key 66.

After the secure mobile IPv6 circuit 60 has finished constructing the neighbor advertisement message 112, including the RSA signature option 130, the secure mobile IPv6 circuit 60 generates a second binding update message 132 in step 134 that includes the signed neighbor advertisement message 112, or at least the care-of address 58, the CGA address 30, and the RSA signature option 130 (in which case the home agent 16 can recreate the neighbor advertisement message 112 from the cached values in the binding acknowledgment message sent in step 80).

In response to the home agent 16 receiving the second binding update message 132 with the signed neighbor advertisement message 112b (or at least the care of address 58, the CGA address 30, and the RSA option 130), the home agent circuit 34 determines in step 136 whether any neighbor advertisement (NA) message has been received that asserts a conflict with the unsigned neighbor solicitation message 76 output in step 74. If in step 136 the home agent circuit 34 detects a conflicting neighbor advertisement message, the CGA generation circuit 44 generates a new candidate CGA address in step 138 based on generating a new random number upon increasing the collision count 108, and repeats the process starting at step 74.

If in step 136 the home agent circuit 34 determines no conflicting neighbor advertisement message is received, the home agent circuit updates in step 140 its binding cache 48 to explicitly specify that the candidate CGA address 30 is now a valid CGA address that can be used as a secure mobile IPv6 home address by the mobile node 12, and that the CGA address 30 is reachable via the care of address 58; the SEND circuit 42 also outputs in step 140 the signed neighbor advertisement message 112 supplied in the binding update message 132 (or recreated by the home agent 16) onto the home link 18 in order to claim the CGA address 30 on behalf of the mobile node 12. The home agent circuit 34 also outputs in step 142 a binding acknowledgment specifying an acceptance status 144 (Status=0), enabling the mobile node 12 to begin communications using the new home address 30.

According to the example embodiment, the home agent 16 can dynamically generate a cryptographically generated addresses for the mobile node 12, which can be signed by the mobile node 12 using its private key 66 to enable the home agent 16 to claim the CGA address on the home link 18 on behalf of the mobile node 12.

The home agent 16 also can request additional neighbor advertisement messages from the mobile node, for example where the home agent 16 needs additional neighbor advertisement messages to respond to a neighbor solicitation message from another node (e.g., node 38) on the home link 18, where the solicited bit in the neighbor advertisement message needs to be set; in this case, the home agent 16 can send a Binding Refresh Request to the mobile node with a request for the updated Neighbor Advertisement message to be signed (and with the identified parameters that need updating), causing the mobile node 12 to generate and supply to the home agent 16 the updated Neighbor Advertisement message using the above-described procedures.

Also note that the mobile node 12 can continue to use the home address 30 in response to changing its point of attachment based on obtaining a new care of address. In particular, the secure mobile IPv6 circuit 60 can generate, for output by the IPv6 interface circuit 32 in step 160, a new binding update message 162 specifying that the CGA home address 30 is reachable via a new care of address 164, where the new binding update message 162 can be signed with a signature 166 using the private key 66. Hence, the authentication circuit 46 in the home agent circuit 34 can validate in step 170 the authenticity of the binding update message 162, update its bind cache entry 48, and send back a binding acknowledgment in step 172.

The foregoing also can be applied to network renumbering as described in Section 10.6 of RFC 3775, where the home agent 16 sends in step 174 a Mobile Prefix Advertisement (MPA) message to the mobile node 12, and the mobile node 12 responds in step 178 to the received MPA message by restarting in step 70 the request for a CGA home address within the new prefix.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving by an agent a request from a network node for generation of a cryptographically generated IPv6 address for use by the network node, the request including a selected subset of parameters selected by the network node and required for generation of the cryptographically generated IPv6 address according to a prescribed cryptographic address generation procedure, the selected subset including at least a public key owned by the network node;
dynamically generating by the agent at least a second of the parameters required for generation of the cryptographically generated IPv6 address, the second of the parameters including a random number dynamically generated by the agent;
generating by the agent the cryptographically generated IPv6 address based on the selected subset and the second of the parameters required for generation of the cryptographically generated IPv6 address; and
outputting, by the agent to the network node, an acknowledgment to the request and that includes the cryptographically generated IPv6 address, and the parameters required for generation of the cryptographically generated IPv6 address, wherein the network node retains exclusive authority for signing any neighbor advertisement message associated with the cryptographically generated IPv6 address, according to a prescribed secure neighbor discovery protocol.

2. The method of claim 1, wherein:
the network node is a Mobile IPv6 node and the agent is a home agent;
the request is specified within a binding update message generated by the network node and specifying the network node is reachable via a care-of address, the selected subset of parameters including an identifier for uniquely identifying the network node;

the reply is specified within a binding acknowledgment according to Mobile IPv6, and the cryptographically generated IPv6 address is a secure home address.

3. The method of claim 2, wherein the identifier includes one of a Network Address Identifier or a signature signed by the network node.

4. The method of claim 2, wherein the binding acknowledgment further specifies a destination address specifying the care-of address, a binding update status field identifying a request for generation of a signed neighbor advertisement message, a link local address of the home agent, and a link layer address of the home agent, the method further comprising:
receiving a second binding update message from the network node, the second binding update message including a cryptographic signature of the signed neighbor advertisement message signed by the network node; and
selectively outputting by the home agent the signed neighbor advertisement message on a home link of the home agent, the signed neighbor advertisement message including a source address field specifying the link local address of the home agent, a target address field specifying the cryptographically generated IPv6 address, a link layer address field specifying the link layer address of the home agent, the parameters required for generation of the cryptographically generated IPv6 address, and the cryptographic signature.

5. The method of claim 4, further comprising initiating duplicate address detection by the home agent based on outputting a neighbor solicitation message specifying the cryptographically generated IPv6 address, the binding acknowledgment output independent of any response to the neighbor solicitation message, the selectively outputting including dropping the signed neighbor advertisement message in response to a detected message asserting use of the cryptographically generated IPv6 address.

6. The method of claim 5, wherein the selectively outputting including outputting the signed neighbor advertisement message based on a determined absence of any conflict with the cryptographically generated IPv6 address on the home link.

7. The method of claim 2, wherein the dynamically generating includes:
generating a candidate IPv6 address based on the parameters required for generation of the cryptographically generated IPv6 address;
determining whether another node claims use of the candidate IPv6 address; and
selectively applying the candidate IPv6 address as the cryptographically generated IPv6 address in the binding acknowledgment, based on no other node claiming use of the candidate IPv6 address.

8. The method of claim 2, further comprising:
receiving by the agent from the network node a second binding update message that specifies the cryptographically generated IPv6 address, a care-of address for reaching the cryptographically generated IPv6 address, the parameters required for generation of the cryptographically generated IPv6 address, and a cryptographic signature signed by the network node;
validating by the agent the second binding update message based on verifying the cryptographically generated IPv6 address using the parameters, and verifying the signature based on the public key; and
selectively updating by the agent a binding cache entry to specify the cryptographically generated IPv6 address is reachable via the care-of address specified in the second binding update message, based on validating the second binding update message.

9. A method comprising:
outputting by a network node, to an agent, a request for a cryptographically generated IPv6 address for use by the network node, the request including a public key owned by the network node; and
receiving, by the network node and from the agent, an acknowledgment that includes the cryptographically generated IPv6 address and parameters required for generating the cryptographically generated IPv6 address according to a prescribed cryptographic address generation procedure, the parameters including a random number dynamically generated by the agent, wherein the network node retains exclusive authority for signing any neighbor advertisement message associated with the cryptographically generated IPv6 address, according to a prescribed secure neighbor discovery protocol.

10. The method of claim 9, wherein the network node is a Mobile IPv6 node and the agent is a home agent;
the request is specified within a binding update message generated by the network node and including an identifier for uniquely identifying the network node;
the acknowledgment is specified within a binding acknowledgment according to Mobile IPv6, and the cryptographically generated IPv6 address is a secure home address.

11. The method of claim 10, wherein the identifier includes one of a Network Address Identifier or a signature signed by the network node.

12. The method of claim 10, wherein the binding acknowledgment specifies a destination address specifying a care-of address of the network node, a binding update status field identifying a request for generation of a signed neighbor advertisement message, a link local address of the home agent, and a link layer address of the home agent, the method further comprising:
generating by the network node, in response to the request for generation of a signed neighbor advertisement message, a cryptographic signature of the signed neighbor advertisement message signed by the network node; and
outputting a second binding update message from the network node to the home agent, the second binding update message including the cryptographic signature.

13. The method of claim 12, wherein the second binding update message includes the signed neighbor advertisement message, the signed neighbor advertisement message including a source address field specifying the link local address of the home agent, a target address field specifying the cryptographically generated IPv6 address, a link layer address field specifying the link layer address of the home agent, the parameters required for generation of the cryptographically generated IPv6 address, and the cryptographic signature.

14. The method of claim 10, further comprising:
obtaining by the network node a care-of address based on attachment to an attachment link;
generating by the network node a second binding update message that specifies the cryptographically generated IPv6 address, the care-of address for reaching the cryptographically generated IPv6 address, and the parameters required for generation of the cryptographically generated IPv6 address;
signing by the network node the second binding update message with a cryptographic signature based on a private key owned by the network node and corresponding to the public key; and outputting by the network node the signed second binding update message, including the cryptographic signature, to the home agent.

15. The method of claim 9, further comprising:
receiving, by the network node, a mobile prefix advertisement (MPA) message from the agent and specifying a new address prefix distinct from an address prefix of the cryptographically generated IPv6 address; and
outputting, by the network node, a second request for a new cryptographically generated IPv6 address having the new address prefix for use by the network node, the request including the public key; and
receiving, by the network node and from the agent, a second acknowledgment that includes the new cryptographically generated IPv6 address and parameters for generating the new cryptographically generated IPv6 address according to the prescribed cryptographic address generation procedure.

16. An apparatus comprising:
an IPv6 interface circuit configured for receiving a request from a network node for generation of a cryptographically generated IPv6 address for use by the network node, the request including a selected subset of parameters selected by the network node and required for generation of the cryptographically generated IPv6 address according to a prescribed cryptographic address generation procedure, the selected subset including at least a public key owned by the network node; and
an agent circuit configured for generating the cryptographically generated IPv6 address based on dynamically generating at least a second of the parameters required for generation of the cryptographically generated IPv6 address and based on applying the second of the parameters with the selected subset for generation of the cryptographically generated IPv6 address;
the agent circuit further configured for generating an acknowledgment to the request and that includes the cryptographically generated IPv6 address, and the parameters required for generation of the cryptographically generated IPv6 address, for output by the IPv6 interface circuit to the network node, wherein the network node retains exclusive authority for signing any neighbor advertisement message associated with the cryptographically generated IPv6 address, according to a prescribed secure neighbor discovery protocol.

17. The apparatus of claim 16, wherein:
the network node is a Mobile IPv6 node and the apparatus is identified as a home agent;
the request is specified within a binding update message generated by the network node and specifying the network node is reachable via a care-of address, the selected subset of parameters including an identifier for uniquely identifying the network node;
the reply is specified within a binding acknowledgment according to Mobile IPv6, and the cryptographically generated IPv6 address is a secure home address.

18. The apparatus of claim 17, wherein the identifier includes one of a Network Address Identifier or a signature signed by the network node.

19. The apparatus of claim 17, wherein the binding acknowledgment generated by the agent circuit further specifies a destination address specifying the care-of address, a binding update status field identifying a request for generation of a signed neighbor advertisement message, a link local address of the home agent, and a link layer address of the home agent, wherein:

the IPv6 interface circuit is configured for receiving a second binding update message from the network node, the second binding update message including a cryptographic signature of the signed neighbor advertisement message signed by the network node; and
the agent circuit is configured for selectively causing the IPv6 interface circuit to output the signed neighbor advertisement message on a home link, the signed neighbor advertisement message including a source address field specifying the link local address of the home agent, a target address field specifying the cryptographically generated IPv6 address, a link layer address field specifying the link layer address of the home agent, the parameters required for generation of the cryptographically generated IPv6 address, and the cryptographic signature.

20. The apparatus of claim 19, wherein the agent circuit is configured for initiating duplicate address detection based on outputting a neighbor solicitation message specifying the cryptographically generated IPv6 address, the binding acknowledgment being output by the agent circuit independent of any response to the neighbor solicitation message, the agent circuit configured for dropping the signed neighbor advertisement message in response to a detected message asserting use of the cryptographically generated IPv6 address.

21. The apparatus of claim 20, wherein the agent circuit is configured for outputting the signed neighbor advertisement message based on a determined absence of any conflict with the cryptographically generated IPv6 address on the home link.

22. The apparatus of claim 17, wherein the agent circuit is configured for:
generating a candidate IPv6 address based on the parameters required for generation of the cryptographically generated IPv6 address,
determining whether another node claims use of the candidate IPv6 address; and
selectively applying the candidate IPv6 address as the cryptographically generated IPv6 address in the binding acknowledgment, based on no other node claiming use of the candidate IPv6 address.

23. The apparatus of claim 17, wherein:
the IPv6 interface circuit is configured for receiving from the network node a second binding update message that specifies the cryptographically generated IPv6 address, a care-of address for reaching the cryptographically generated IPv6 address, the parameters required for generation of the cryptographically generated IPv6 address, and a cryptographic signature signed by the network node;
the agent circuit is configured for validating the second binding update message based on verifying the cryptographically generated IPv6 address using the parameters, and verifying the signature based on the public key, selectively updating a binding cache entry to specify the cryptographically generated IPv6 address is reachable via the care-of address specified in the second binding update message, based on validating the second binding update message.

24. An apparatus for use as a network node comprising:
a security circuit configured for generating a request to an agent for a cryptographically generated IPv6 address, the request including a public key owned by the network node; and
an IPv6 interface circuit configured for outputting the request to the agent, and receiving from the agent an acknowledgement that includes the cryptographically generated IPv6 address and parameters required for generating the cryptographically generated IPv6 address according to a prescribed cryptographic address generation procedure, the parameters including a random number dynamically generated by the agent, wherein the network node retains exclusive authority for signing any neighbor advertisement message associated with the cryptographically generated IPv6 address, according to a prescribed secure neighbor discovery protocol.

25. The apparatus of claim 24, wherein the network node is a Mobile IPv6 node and the agent is a home agent;
the request is specified within a binding update message generated by the network node and including an identifier for uniquely identifying the network node;
the acknowledgment is specified within a binding acknowledgment according to Mobile IPv6, and the cryptographically generated IPv6 address is a secure home address.

26. The apparatus of claim 25, wherein the identifier includes one of a Network Address Identifier or a signature signed by the network node.

27. The apparatus of claim 25, wherein:
the binding acknowledgment specifies a destination address specifying a care-of address of the network node, a binding update status field identifying a request for generation of a signed neighbor advertisement message, a link local address of the home agent, and a link layer address of the home agent;
the security circuit further configured for generating, in response to the request for generation of a signed neighbor advertisement message, a cryptographic signature of the signed neighbor advertisement message signed by the network node, causing the IPv6 interface circuit to output a second binding update message to the home agent, the second binding update message including the cryptographic signature.

28. The apparatus of claim 27, wherein the second binding update message includes the signed neighbor advertisement message, the signed neighbor advertisement message including a source address field specifying the link local address of the home agent, a target address field specifying the cryptographically generated IPv6 address, a link layer address field specifying the link layer address of the home agent, the parameters required for generation of the cryptographically generated IPv6 address, and the cryptographic signature.

29. The apparatus of claim 25, wherein:
the IPv6 interface circuit is configured for obtaining a care-of address based on attachment to an attachment link;
the security circuit configured for generating a second binding update message that specifies the cryptographically generated IPv6 address, the care-of address for reaching the cryptographically generated IPv6 address, and the parameters required for generation of the cryptographically generated IPv6 address;
the security circuit further configured for signing the second binding update message with a cryptographic signature based on a private key owned by the network node and corresponding to the public key; and
the IPv6 interface circuit is configured for outputting the signed second binding update message, including the cryptographic signature, to the home agent.

30. The apparatus of claim 24, wherein:
the IPv6 interface circuit is configured for receiving a mobile prefix advertisement (MPA) message from the agent and specifying a new address prefix distinct from an address prefix of the cryptographically generated IPv6 address;
the security circuit further configured for outputting a second request for a new cryptographically generated IPv6 address having the new address prefix for use by the apparatus, the request including the public key;
the IPv6 interface circuit further configured for receiving from the agent a second acknowledgment that includes the new cryptographically generated IPv6 address and parameters for generating the new cryptographically generated IPv6 address according to the prescribed address generation procedure.

31. Logic encoded in one or more non-transitory tangible computer readable media for execution, and when executed:
receiving a request from a network node for generation of a cryptographically generated IPv6 address for use by the network node, the request including a selected subset of parameters selected by the network node and required for generation of the cryptographically generated IPv6 address according to a prescribed cryptographic address generation procedure, the selected subset including at least a public key owned by the network node; and
generating the cryptographically generated IPv6 address based on dynamically generating at least a second of the parameters required for generation of the cryptographically generated IPv6 address and based on applying the second of the parameters with the selected subset for generation of the cryptographically generated IPv6 address;
generating further an acknowledgement to the request and that includes the cryptographically generated IPv6 address, and the parameters required for generation of the cryptographically generated IPv6 address, for output to the network node, wherein the network node retains exclusive authority for signing any neighbor advertisement message associated with the cryptographically generated IPv6 address, according to a prescribed secure neighbor discovery protocol.

32. Logic encoded in one or more non-transitory tangible computer readable media for execution, and when executed:
generating a request to an agent for a cryptographically generated IPv6 address for use by a network node, the request including a public key owned by the network node; and
outputting the request to the agent, and receiving from the agent an acknowledgment that includes the cryptographically generated IPv6 address and parameters required for generating the cryptographically generated IPv6 address according to a prescribed cryptographic address generation procedure, the parameters including a random number dynamically generated by the agent, wherein the network node retains exclusive authority for signing any neighbor advertisement message associated with the cryptographically generated IPv6 address, according to a prescribed secure neighbor discovery protocol.

* * * * *